Feb. 11, 1969 A. P. TRUFFERT 3,427,459
TRANSDUCER HAVING A CONVERSION CHARACTERISTIC
OF A PREDETERMINED FORMATION
Filed Sept. 23, 1965
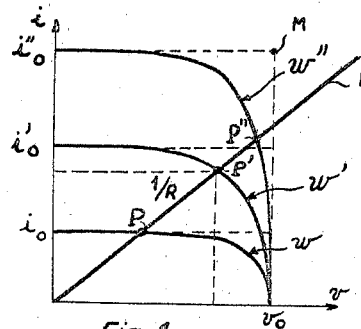
Fig. 1
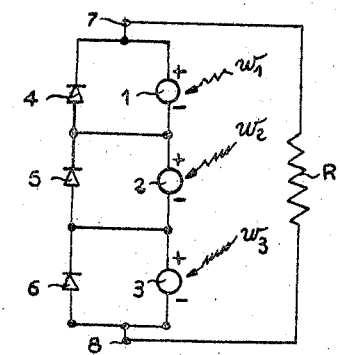
Fig. 2
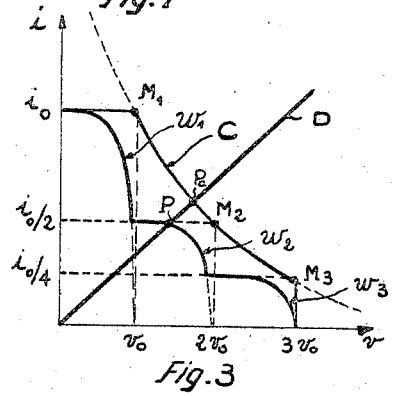
Fig. 3
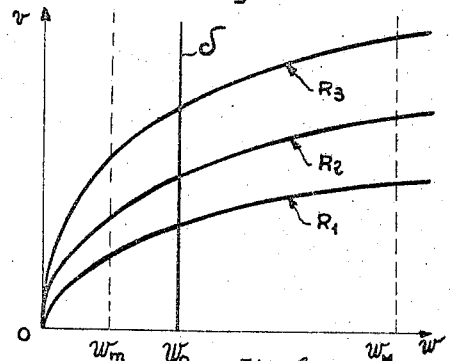
Fig. 4
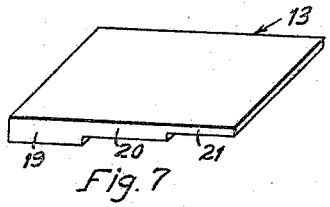
Fig. 7
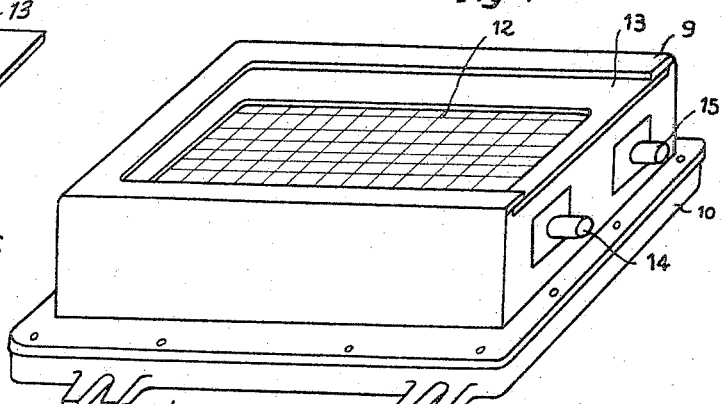
Fig. 6
Fig. 5
Alain Philippe Truffert,
Inventor
By Wenderoth, Lind & Ponack,
Attorneys United States Patent Office 3,427,459
Patented Feb. 11, 1969

3,427,459
TRANSDUCER HAVING A CONVERSION CHARACTERISTIC OF A PREDETERMINED FORMATION
Alain Philippe Truffert, Montrouge, France, assignor to Societe Anonyme de Telecommunications, Paris, France, a French body corporate
Filed Sept. 23, 1965, Ser. No. 489,646
Claims priority, application France, Oct. 7, 1964, 990,621
U.S. Cl. 250—209     8 Claims
Int. Cl. H01j 39/12, 39/00; H01m 15/02

ABSTRACT OF THE DISCLOSURE

This invention relates to a thermo-electric or photo-electric transducer of which the conversion characteristic output voltage/incident energy is a predetermined function; this transducer consists essentially of a cascade of transducing units, with rectifiers being connected with reverse polarity across the said transducing units; these transducing units are arranged to have, for a constant incident energy, respective short-circuit currents of different, conveniently stepped values.

---

The present invention relates to a thermo-electric or photo-electric transducer, in which the conversion characteristic: output voltage/incident energy, is a predetermined function.

Thermo-electric cells and photo-electric cells are transducers which enable an incident energy, which is of a thermal or radiant nature respectively, to be converted into electrical energy. With a constant load resistance, however, the conversion characteristics of these cells are generally linear, at least within a certain range, that is to say the cell applies to the terminals of a constant load resistor, an electrical voltage which varies linearly as a function of the illumination, in the case of a photo-electric cell, or of the difference in the temperature of its hot and cold sources, in the case of a thermo-electric cell. Nevertheless, for numerous scientific and technical applications, thermo-electric and photo-electric transducers are needed, in which the conversion characteristics are not linear, but coincide with predetermined functions, for example a logarithmic function, a homographic function . . . etc., according to the application considered.

A first object of the invention is to provide a thermo-electric or photo-electric transducer of the type indicated at the beginning, and consisting essentially of thermo-electric or photo-electric cells or groups of cells, which are connected in series, and with each of which a rectifier is connected in parallel in such a manner as to be polarised in the backward direction, the successive cells, or groups of cells, in the series, being selected in such a manner that their respective short-circuit currents, for one and the same incident energy, correspond to the ordinates of successive points in the current-voltage characteristic curve of a single ideal cell, adapted to obtain, by itself, the predetermined conversion characteristic, the abscissae of two of said successive points in said ideal current/voltage characteristic curve, further differing by a quantity equal to the no-load voltage of the corresponding cell, or group of cells.

Another object of the invention is to provide a transducer of the type indicated above, and in which the cells or groups of cells connected in series, as well as the rectifiers associated therewith, are placed, with electrical insulation, and possibly thermal insulation, in an envelope, such as a case or container comprising two output terminals, which are insulated electrically and possibly thermally, for the connection of the cells or groups of cells to a load, at least one of the walls of the envelope being at least partially transparent to the incident energy.

Several embodiments of a photo-electric transducer according to the invention will now be described by means of the accompanying drawing.

FIGURE 1 illustrates the current-voltage characteristics, for a constant incident energy, of a photo-electric cell which may be used to constitute a photo-electric transducer according to the invention;

FIGURE 2 is the electrical diagram of a photo-electric transducer according to the invention, with three cells;

FIGURE 3 illustrates one of the current/voltage characteristics, for a constant incident energy, of the photo-electric transducer, the diagram of which is illustrated in FIGURE 2;

FIGURES 4 and 5 are diagrams adapted to illustrate the determination of the cells of a photo-electric transducer according to the invention, having a predetermined conversion characteristic.

FIGURE 6 illustrates a case-enclosed photo-electric transducer according to the invention.

FIGURE 7 illustrates another embodiment of the covering plate provided in the transducer of FIGURE 6.

The photo-electric transducer according to the invention may be composed of ordinary photo-electric cells, having current/voltage characteristics, $i/v$, with a constant incident energy $w$, such as those illustrated in FIGURE 1 for increasing values, $w$, $w'$, $w''$, of the radiant energy which strikes the photo-electric cell. When a load resistor of value $R$ is connected to the terminals of the photo-electric cell in question, this applies to the terminals of said load resistor, a voltage $v$, and passes to it a current $i$, which are respectively equal to the abscissae and to the ordinate of the working point P, situated at the intersection of the current/voltage characteristic corresponding to the value $w$ of the incident energy, with the straight line D passing through the origin of the co-ordinates and having the slope $1/R$. It will be seen, that if the value of the load resistance, $R$, is caused to vary from the value 0 (cell short-circuited) to an infinite value (load zero) while the incident energy $w$ is constant, the current $i$ delivered by the photo-electric cell is reduced from its short-circuit value $i_0$ to 0 (load zero), while the voltage $v$ at its terminals increases from 0 (short-circuit) to the value $v_0$ of its no-load voltage. Whereas this no-load voltage $v_0$ is the same whatever the value $w$ of the incident energy, the short-circuit current $i_0$ is, itself, substantially proportional to said incident energy $w$. Substantially the same applied to the co-ordinates of the working point P, particularly its abscissa $v$. It follows that the conversion characteristic: output voltage/incident energy, $v/w$, of a photo-electric cell of this kind is substantially rectilinear.

The photo-electric transducer according to the invention, the diagram of which is illustrated in FIGURE 2, has, on the other hand, a non-linear conversion characteristic, as will be shown hereinafter. This photo-electric transducer consists essentially of three photo-electric cells 1, 2, 3 having current/voltage characteristics such as those illustrated in FIGURE 1; these photo-electric cells 1, 2, 3 are connected in series between the output terminals 7 and 8 of the transducer, and, a rectifier 4, 5 or 6, particularly a diode, is connected in parallel with each of them, in such a manner as to be polarised in the backward direction by the D.C. voltage $v$, produced at the terminals of the corresponding photo-electric cell when it is irradiated by a certain energy $w$; a load resistor $R$ is connected between the output terminals 7 and 8 of the actual photo-electric transducer. Means, which will be indicated subsequently, are further provided so that, if the whole of the photo-electric transducer receives a certain energy $w$, each of the photo-electric cells 1, 2, 3 will receive separately radiant energies of different values $w_1$, $w_2$, $w_3$ respectively, of which the greatest is equal to $w$. In the specific embodiment under consideration, it is further assumed that $w_2$ is equal to half $w_1$, and $w_3$ to a quarter thereof, so that, if the short-circuit current of the cell 1 is designated by $i_0$, the short-circuit currents of the cells 2 and 3 are respectively $i_0/2$ and $i_0/4$; it is further assumed that all the photo-electric cells 1, 2, 3 have the same no-load voltage $v_0$. If it is noted that the fact of connecting a rectifier to the terminals of a photo-electric cell, in such a manner that the latter polarises it in the backward direction, does not substantially modify the current/voltage characteristic of said photo-electric cell, because of the very high backward resistance of the rectifier, it will be understood that the current/voltage characteristic of the photo-electric transducer of FIGURE 2, with a constant incident energy $w$, consists, as illustrated in FIGURE 3, of the juxtaposition of the current/voltage characteristics of the three photo-electric cells 1, 2, 3 for the incident energies having values $w_1$, $w_2$, $w_3$ which they receive respectively. Actually, when the load resistance R has a value zero, the cell 1 delivers to the load R its short-circuit current $i_0$; since the cells 2 and 3 can then only be traversed respectively by half and quarter of the current $i_0$ which returns from the load R, corresponding fractions of this current are branched off respectively through the rectifier 5 ($i_0/2$) and 6 ($3/4\, i_0$); no current then passes through the rectifier 4, however, which remains polarised in a backward direction by the cell 1. On the other hand, when the load resistance has an infinite value, the voltage between the terminals 7 and 8 of the transducer is very close to three times the no-load voltage of each of the cells 1, 2, 3 because the backward resistances of the rectifiers 4, 5, 6 are very high. For all the finite values other than zero of the load resistor R, the voltage and the current which are applied thereto are respectively equal to the abscissa and to the ordinate of the point of intersection P of the load line D, having a slope $l/R$, with the characteristic $w_1$-$w_2$-$w_3$, which is illustrated in full lines in FIGURE 3, and which consists of the connection of three arcs corresponding respectively to the current/voltage characteristics of the three photo-electric cells, considered independently of one another.

The embodiment of the photo-electric transducer according to the invention is based on the approximation which consists in substituting for the current/voltage characteristic formed from a plurality of arcs $w_1$-$w_2$-$w_3$, an approximate characteristic C, defined by the fact that it passes through the summits $M_1$, $M_2$, $M_3$ of the rectangles in which are respectively inscribed the characteristic curves of the various photo-electric cells, considered independently of one another. Since the first stage in this approximation consists in replacing each of the elemental characteristics $w_1$, $w_2$, $w_3$, by the two sides of the rectangle in which it is inscribed, and to which it is respectively tangential for a zero load and for an infinite load, it will be understood that the systematic error resulting from the approximation can be kept very low if, in accordance with a feature of the invention, each photo-electric cell has a current/voltage characteristic, with a constant incident energy, which has a strong negative slope in the vicinity of the no-load voltage.

It can be easily shown that the arc of the approximate characteristic C comprised between the points $M_1$ and $M_3$ has as its equation:

(1) $$i = \frac{i_0}{2(v-v_0)/v_0}$$

Since, on the other hand, the short-circuit current $i_0$ of the cell 1 is proportional to the incident energy $w$, to which the energy received by the said cell 1, $w_1$, is itself equal or constantly proportional, it may be deduced from the above Formula 1:

(2) $$v = Ri = \frac{aRw}{2(v-v_0)/v_0}$$

in which $a$ designates a constant coefficient (with a constant load); it follows that the conversion characteristic of the photo-electric transducer of FIGURE 2 has substantially as its equation:

(3) $$w = \frac{1}{aR} \cdot v \cdot 2(v-v_0)/v_0$$

and that, in consequence, it is not linear, although the transducer in question is formed exclusively from photo-electric cells having linear conversion characteristics.

It will be shown by means of FIGURES 4 and 5, how it is possible to constitute a photo-electric transducer according to the invention, of which the conversion characteristics is a predetermined founction $v = f(w)$, by connecting in series, between the two output terminals of said transducer, as illustrated in FIGURE 2, an appropriate number of photo-electric cells, with each of which a rectifier is connected in parallel in such a manner as to be polarised in a backward direction. Since the conversion characteristic depends on the value of the load R, it is generally given in the form of a system of curves such as that shown in FIGURE 4, for which the general question is:

(4) $$v = f(w, R)$$

in which the value R of the load acts as a parameter. On the other hand, it is assumed that the incident energy $w$ may vary in a continuous manner between two extreme values $w_m$ and $w_M$. From this system of conversion characteristics, it is possible to construct without difficulty, for example graphically, the system of current/voltage characteristics which the photo-electric transducer to be determined should have; for this, the points of intersection of the conversion characteristics in FIGURE 4, are considered for successive values, for example increasing values, $R_1$, $R_2$, $R_3$, of the load R, with a straight line parallel with the axis Ov, and having the abscissa $w_0$ comprised between $w_m$ and $w_M$; in the graph $i/v$ in FIGURE 5, successive points are entered, having abscissae $v$ equal to the ordinates of the points of intersection mentioned, and ordinates, $i$, equal to their abscissae divided by the values $R_1$, $R_2$, $R_3$ ... of the parameter R of the corresponding conversion characteristics; this geometrical construction enables the current/voltage characteristic $C_0$ of FIGURE 5, corresponding to the value $w_0$ of the incident energy to be made to correspond to the straight line $\delta$ of FIGURE 4, with abscissa $w_0$. It is thus possible to draw the current/voltage characteristic curves which the transducer according to the invention should have for all the values $w$ of the incident energy, comprised between its minimum value $w_m$ and maximum value $w_M$; it is only necessary however to consider the extreme characteristics $C_m$, corresponding to $w_m$, and $C_M$ corresponding to $w_M$, and any intermediate characteristic $C_0$, corresponding to $w_0$.

Moreover, if the system of current/voltage characteristics which the transducer according to the invention should have is given in analytical form, that is to say if the analytical term of the function $f$ appearing on the right-hand side of the Equation 4 above, is known, it is possible to determine the analytical equation:

(5) $$i = g(v, w)$$

of the system of current/voltage characteristics of said transducer, for constant values of the incident energy $w$. Actually, since in the approximation illustrated in FIGURE 3, which forms the basis of the present invention, and which consists in merging the real working point P with a neighbouring working point $P_a$, corresponding to an ideal current/voltage characteristic C, the ordinate of said working point P is proportional, with a constant abscissa $v$ of said point, to the short-circuit current of the corresponding photo-electric cell, and consequently to the incident energy $w$, and since this property is independent of the number of photo-electric cells constituting the transducer, the relationships:

(6) $$f(w,R)=f(kw,R')$$

(6') $$R'=\frac{v}{Ki}=\frac{R}{K}$$

are obtained in which $R'$ is the value of the load at which the transducer, when it is irradiated by the energy $kw$, applies a voltage $v$ equal to that which it applies at the load R when it is irradiated by the energy $w$; by designating a certain value of the incident energy by $w_0=Kw$, the relationships 6 and 6' enable the Equation 4 to be given in the form:

(7) $$vf=\left(w_0',\frac{Rw}{w_0}\right)=f_1(Rw)$$

which shows that $v$ is a function of the only variable $(Rw)$; if the inverse of the function $f_1$ is designated by $\Phi$, namely:

(8) $$Rw=\Phi(v)$$

it will easily be seen that:

(9) $$i=g(v;w)=\frac{v}{R}=w\frac{v}{\Phi(v)}$$

The Formula 9 therefore renders it possible to calculate the analytical expression of the current/voltage characteristics with a constant incident energy, which the photoelectric transducer according to the invention should have in order that its conversion characteristic may be a predetermined function, of which the analytical expression is given by the Formula 4 above, the function $\Phi$ being deduced by inversion of the function $f_1$ defined by Formula 7. By way of example, in order to obtain parabolic conversion characteristics, having the appearance of those illustrated in FIGURE 4, and with the equation:

(10) $$v=b\sqrt{Rw}$$

in which $b$ designates a constant, since:

(11) $$Rw=\frac{v^2}{b^2}=\Phi(v)$$

the Formula 9 above gives the following equation for the corresponding current/voltage characteristics:

(12) $$i=\frac{w\cdot v}{v^2/b^2}=b^2\cdot w,\frac{1}{v}$$

which are consequently equilateral hyperboles, having the appearance of the characteristic curves in FIGURE 5. It is noteworthy that, in this case, the electric power delivered to the load:

(13) $$\frac{v^2}{R}=b^2\cdot w$$

is independent of the latter, and proportional to the incident energy.

According to another example, in order to obtain logarithmic conversion characteristics with the equation:

(14) $$v=c\log(Rw/d)$$

in which $c$ and $d$ designate two constants, since:

(15) $$Rw=de^{v-c}=\Phi(v)$$

the transducer should have current/voltage characteristics with a constant incident energy, $w$, in accordance with the equation:

(16) $$i=w\cdot\frac{v}{de^{v/c}}=\frac{w}{d}\cdot ve^{-v/c}$$

that is to say curves having an inverse exponential course.

Since it is generally impossible to find arrangements in series and/or in parallel for existing photo-electric cells, for which the current/voltage characteristic, for a certain incident energy $w_0$ for example, has precisely the shape of the curve $C_0$ in FIGURE 5, an approximate solution of the problem posed may be obtained by means of a transducer of the type illustrated in FIGURE 2, and comprising a suitable number of photo-electric cells, not necessarily equal to three, and probably even greater, selected in such a manner as to obtain as a first approximation, a stepped current/voltage characteristic, in which the tops of the steps $M_1$, $M_2$, $M_3$, $M_4$ are on said ideal characteristic curve $C_0$. The number and the characteristics of the photo-electric cells which should then be used to constitute this transducer may be determined, for example, in the following manner: if the straight load line D, having a slope equal to the reciprocal of the value of the load resistor, intercepts the characteristic curves corresponding to the extreme values $w_m$ and $w_M$ of the incident energy, at points, the abscissae of which correspond to the minimum value $v_m$ and maximum value $v_M$, respectively, of the voltage applied to the load, the transducer according to the invention may be composed of conventional photoelectric cells all having the same no-load voltage:

(17) $$v_0=v_m$$

in which case the number of these photo-electric cells, having the same no-load voltage $v_0$, connected in series in accordance with FIGURE 2, should be selected equal to the whole number $n$ closest to:

(18) $$\frac{v_M-v_m}{v_0}+1=\frac{v_M}{v_m}$$

In the example illustrated in FIGURE 5, $n=4$. On the other hand, these $n$ photo-electric cells should be selected in such a maner as to have short-circuit currents respectively equal to the ordinates $i_{01}$, $i_{02}$, $i_{03}$, $i_{04}$ ... of the points $M_1$, $M_2$, $M_3$, $M_4$ ... of the ideal characteristic curve $C_0$, that is to say of the points on said curve for which the abscissae are respectively $v_0$, $2v_0$, $3v_0$, $4v_0$ etc. ... This may be achieved in various different ways. In the first place, the various photo-electric cells may be arranged in such a manner that each of them receives the same fraction of the total incident energy; in order that their short-circuit currents may then have the stepped values mentioned previously, photo-electric cells are selected which, while having the same no-load voltage $v_0$, have different sensitivities which are suitably stepped. It is also possible, however, to use photo-electric cells which have both the same no-load voltage $v_0$ and the same short-circuit current $i_0$, that is to say which all have the same sensitivity; in this case, however, means must be provided to ensure that each photoelectric cell only receives a suitable fraction of the incident energy; these means may consist, for example, of more or less absorbent screens, or of diaphragms having a greater or smaller aperture; in the first case, the fraction of the incident energy which is transmitted to the photo-electric cell depends on the absorption power of the screen, for example on its thickness, whereas, in the second case, said fraction of the incident energy depends on the fraction of the surface of said photo-electric cell which is irradiated by the aperture of the diaphragm.

By way of modification, each of the independent photo-electric cells, 1, 2, 3, which are connected in series in accordance with FIGURE 2, may be replaced by a group of photo-electric cells, each having current/voltage characteristics of the type illustrated in FIGURE 1, and connected in series and/or in parallel; the number of the connections of the different cells constituting each of these groups, may then easily be selected to give the different groups sensitivities, and consequently resulting short-circuit currents, having the stepped values which are necessary, as explained previously with reference to FIGURE 5.

Likewise by way of modification, the various photo-electric cells, or groups of cells, used to constitute the transducer of FIGURE 2, may have different no-load voltages $v_0$; the explanations given previously with reference to FIGURE 5 are sufficient to enable the characteristics which the photo-electric cells used should have, to be determined even in this case. In practice, the transducer according to the invention would be constituted with a number of photo-electric cells greatly exceeding the numbers envisaged previously by way of example, in order that the stepped current/voltage characteristics may come as close as possible to the ideal characteristics.

As illustrated in FIGURE 6, the battery composed of all the photo-electric cells connected in series, and of the rectifiers, particularly diodes, associated therewith, in accordance with the electric diagram of FIGURE 2, is placed in a case 9, provided with a base 10, in turn provided with fixing lugs 11 and 11'; the upper portion of the case 9 comprises an aperture through which the battery 12 is introduced, and which is adapted in such a manner that the sensitive surfaces of the photo-electric cells form a horizontal mosaic, turned towards the outside of the case, that is to say upwards in FIGURE 6; all these sensitive surfaces are covered by a plate 13 of uniform thickness, of which only certain zones 16, 17, 18 of different, conveniently stepped areas are transparent to radiation, and which also serves to protect the battery. Inside the case 9, the terminals 7 and 8 of the battery (FIGURE 2) are electrically connected respectively to two terminals 14 and 15, which pass through one of the walls of the case 9 while being electrically insulated; the load resistor, which is not illustrated in FIGURE 6, should be connected to these terminals 14 and 15. If the case 9 is of a material which is an electrical conductor, the battery should be arranged inside said case in such a manner as to be electrically insulated therefrom.

FIGURE 7 illustrates another embodiment of the covering plate 13 provided in the transducer of FIGURE 6, which comprises transparent zones 19, 20, 21 of a same area, but of different, conveniently stepped thickness.

The present invention likewise relates to thermo-electric transducers, in which the conversion characteristic is a predetermined function; their electrical diagram coincides with that of the photo-electric transducer in FIGURE 2, but the flows of radiant energy are replaced respectively by flows of thermal energy, brought to each of the thermo-electric cells by thermal conductors, in close contact with said cells. The principle of operation of the thermo-electric transducers according to the invention coincide precisely with that explained previously with reference to a photo-electric transducer; in order to obtain the necessary stepped values of the short-circuit currents in the various thermo-electric cells, it is possible to use, as indicated previously, either cells, or groups of cells, having different sensitivities, or cells or groups of cells, having the same sensitivity, but receiving different fractions of the total thermal energy transmitted to the transducer, for example by means of the association of thermal conductors, having different thermal impedances, or by the insertion, between these and the thermo-electric cells, of thermal screens, having different effectiveness, particularly different thicknesses. If a thermo-electric transducer according to the invention is mounted in a case, as illustrated in FIGURE 6, all the walls of said case may be opaque, but two of them should have passages, for example, for thermal conductors, which are respectively connected to the hot and cold sources; particularly in the case where said case consists of a material which is a good conductor of heat, said passages should be thermally insulated from said case, as should be battery itself and its electrical output terminals.

What I claim is:

1. A thermo-electric or photo-electric transducer, of which the conversion characteristic output voltage/incident energy is a predetermined function, this transducer consisting of two output terminals, of a plurality of transducing units interconnected in cascade between the said two output terminals, each of said units having a plus and a minus terminal and comprising at least one transducing cell inserted between said plus and minus terminals of the unit, and of a same plurality of rectifiers, each of which has a cathode and an anode respectively connected to the plus and the minus terminal of one of said transducing units, and the successive transducing units are arranged to have, for a constant incident energy, respective short-circuit currents of different stepped values, which are respectively equal to the ordinates of successive points in the current/voltage characteristic corresponding to the said predetermined conversion characteristic of the transducer, the abscissae of said successive points being respectively equal to the voltages measured, with no lead being connected to the output terminals of the transducer, between one of said output terminals and the respective terminals of the successive units interconnected in cascade, which are opposite to the said one output terminal of the transducer.

2. The transducer of claim 1, in which the transducing cells have, for a constant incident energy, a current/voltage characteristic with a strong negative slope in the vicinity of the no-load voltage.

3. A thermo-electric or photo-electric transducer, of which the conversion characteristic output voltage/incident energy is a predetermined function, this transducer consisting of two output terminals, of a plurality of transducing units having all a same sensitivity and being interconnected in cascade betwen the said two output terminals, each of said units having a plus and a minus terminal and comprising at least one transducing cell inserted between said plus and minus terminals of the unit, and of a same plurality of rectifiers, each of which has a cathode and an anode respectively connected to the plus and the minus terminal of one of said transducing units, and means are provided for transmitting respectively to the successive transducing units fractions of the total incident energy having different stepped values, which are respectively proportional to the ordinates of successive points in the current/voltage characteristic corresponding to the said predetermined conversion characteristic of the transducer, the abscissae of said successive points being respectively equal to the voltages measured, with no load being connected to the output terminals of the transducer, between one of said output terminals and the respective terminals of the successive units interconnected in cascade, which are opposite to the said one output terminal of the transducer.

4. A photo-electric transducer as in claim 3, comprising a plurality of differently absorbing screens, which are respectively disposed on the photo-electric units for transmitting thereto different, stepped fractions of the incident light energy.

5. A photo-electric transducer as in claim 3, comprising a plurality of diaphragms having apertures of different, stepped areas and respectively disposed on the photo-electric units for transmitting thereto different, stepped fractions of the incident light energy.

6. A thermo-electric transducer as in claim 3, comprising a plurality of thermal conductors having respective thermal impedances of different, stepped values, and respectively disposed in contact with the thermo-electric units for transmitting thereto different, stepped fractions of the thermal input energy.

7. A thermo-electric transducer as in claim 3, comprising a plurality of thermal conductors having respective thermal impedances of a same value, and of a same plurality of thermal screens, respectively inserted between the said thermal impedances and the thermo-electric units for transmitting thereto different, stepped fractions of the thermal input energy.

8. A thermo-electric or photo-electric transducer, of which the conversion characteristic output voltage/incident energy is a predetermined function, this transducer consisting of a case having walls opaque to the incident energy and a further wall having at least areas transparent to the said incident energy, two output terminals disposed with insulation through one of the walls of the said case, a plurality of transducing units, each of which has a plus and a minus terminal and comprises at least one transducing cell, having a sensitive surface, and disposed with insulation in the said case with its sensitive surface being in contact with one of the transparent areas in the said further wall of the case, said transducing units being electrically interconnected in cascade between the said two output terminals of the transducer, and a same plurality of rectifiers, each of which is also disposed in the case and has a cathode and an anode respectively connected to the plus and the minus terminal of one of said transducing units, and means are provided near to the said further wall of the case for transmitting respectively to the successive transducing units, through the said transparent areas in said further wall, fractions of the total incident energy having different stepped values, which are respectively proportional to the ordinates of successive points in the current/voltage characteritic corresponding to the said predetermined conversion characteristic of the transducer, the abscissae of said successive points being respectively equal to the voltages measured, with no load being connected to the output terminals of the transducer, between one of said output terminals and the respective terminals of the successive units, interconnected in cascade, which are opposite to the said one output terminal of the transducer.

References Cited

UNITED STATES PATENTS

| | | | |
|---|---|---|---|
| 2,624,033 | 12/1952 | Jacquier | 307—77 X |
| 2,949,498 | 8/1960 | Jackson | 136—89 |
| 3,070,699 | 12/1962 | Lehmann et al. | 136—89 X |
| 3,175,929 | 3/1965 | Kleinman | 136—89 |
| 3,176,164 | 3/1965 | Beggs | 310—4 |

ROBERT SEGAL, *Primary Examiner.*

C. R. CAMPBELL, *Assistant Examiner.*

U.S. Cl. X.R.

136—89, 205, 206; 250—208, 212; 307—77; 310—4; 313—96